(12) United States Patent
Polido et al.

(10) Patent No.: US 10,611,037 B1
(45) Date of Patent: Apr. 7, 2020

(54) CONCENTRIC SUCTION CUP ARRAY FOR END-OF-ARM TOOL

(71) Applicant: Amazon Technologies, Inc., Seattle, WA (US)

(72) Inventors: Felipe De Arruda Camargo Polido, North Reading, MA (US); Scott Hopkinson, Concord, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/009,905

(22) Filed: Jun. 15, 2018

(51) Int. Cl.
*B25J 15/06* (2006.01)
*B65G 47/91* (2006.01)

(52) U.S. Cl.
CPC ....... *B25J 15/0683* (2013.01); *B25J 15/0616* (2013.01); *B65G 47/918* (2013.01)

(58) Field of Classification Search
CPC . B25J 15/0616; B25J 15/0683; B65G 47/918; B66C 1/0237; B66C 1/0243
USPC .......................................... 294/183, 188, 65
See application file for complete search history.

(56) References Cited

U.S. PATENT DOCUMENTS

| | | | | |
|---|---|---|---|---|
| 2,745,665 A * | 5/1956 | Labombarde | .......... | B65H 45/26 269/21 |
| 4,088,312 A * | 5/1978 | Frosch | ................... | B23Q 1/035 269/21 |
| 4,995,662 A * | 2/1991 | Hawkswell | ............ | B65G 47/91 29/740 |
| 5,564,682 A * | 10/1996 | Tsuji | ..................... | B25B 11/005 269/21 |
| 5,609,377 A * | 3/1997 | Tanaka | .................. | B65G 47/918 294/65 |
| 5,879,040 A * | 3/1999 | Nagai | ...................... | F16B 47/00 279/3 |
| 6,131,973 A * | 10/2000 | Trudeau | ............... | B25J 15/0616 294/186 |
| 6,457,693 B1 * | 10/2002 | Nagai | .................. | B25J 15/0616 248/205.5 |
| 8,944,481 B2 * | 2/2015 | Collado Jimenez | ........................ | B25J 15/0061 294/185 |
| 2014/0199153 A1 * | 7/2014 | Reinhold | ............. | B65H 3/0816 414/800 |
| 2016/0214812 A1 * | 7/2016 | Johnson | ............... | B65H 3/0816 |

FOREIGN PATENT DOCUMENTS

EP           0336799 A1 * 10/1989  .......... B65G 47/918
GB           2532211      * 5/2016

* cited by examiner

*Primary Examiner* — Dean J Kramer
(74) *Attorney, Agent, or Firm* — BakerHostetler

(57) ABSTRACT

An end of arm tool includes concentric rings of suction cup assemblies. Each suction cup assembly includes a tube for supplying vacuum and a distal suction cup. The suction cup assembly can be longitudinally moveable (that is, in a retraction direction) upon engaging an item. Each ring has a vacuum control. Each ring can have its own action or compliance.

18 Claims, 14 Drawing Sheets

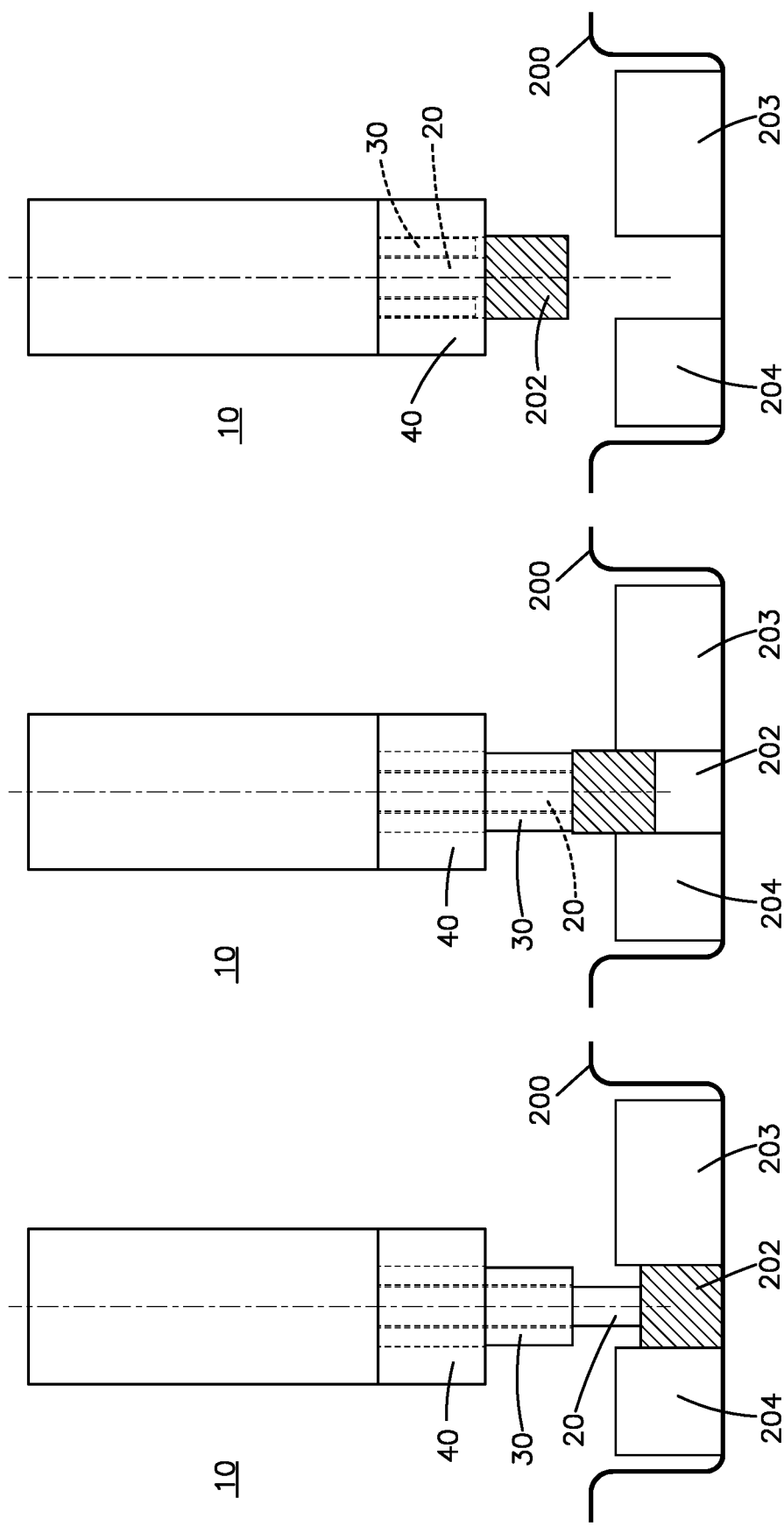

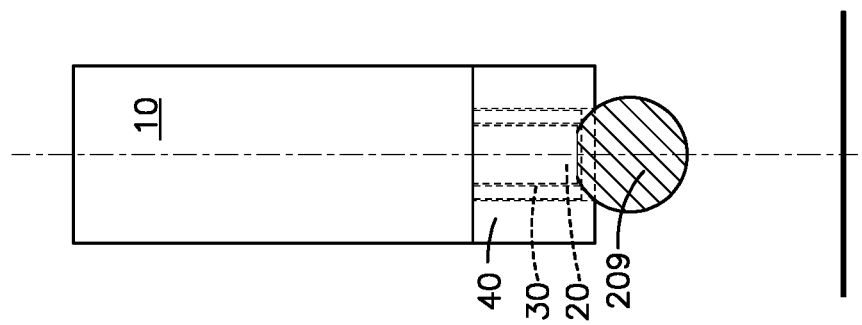
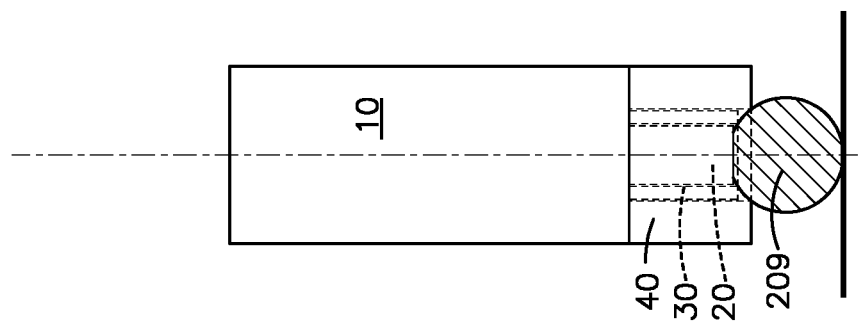
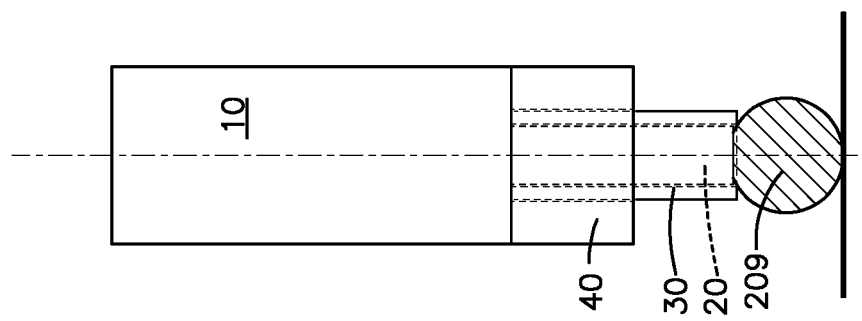
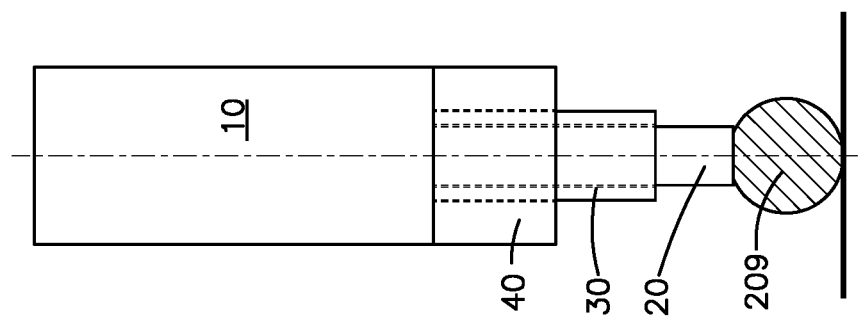

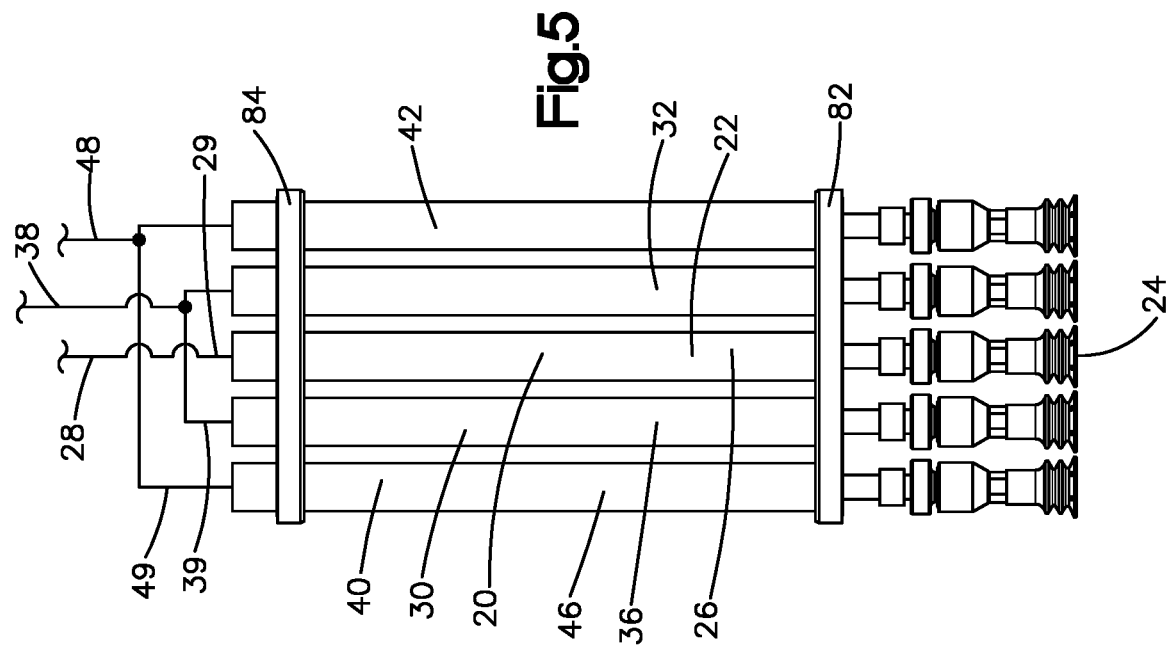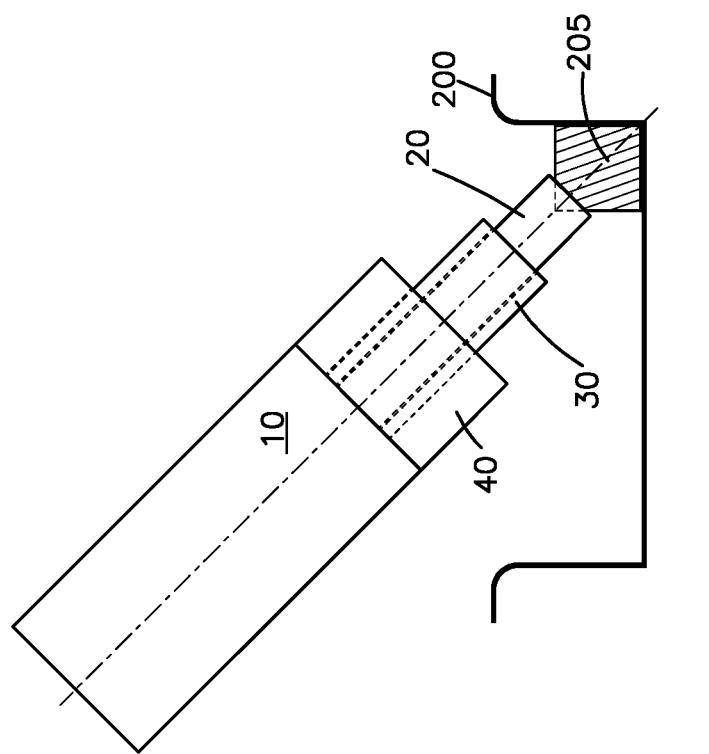

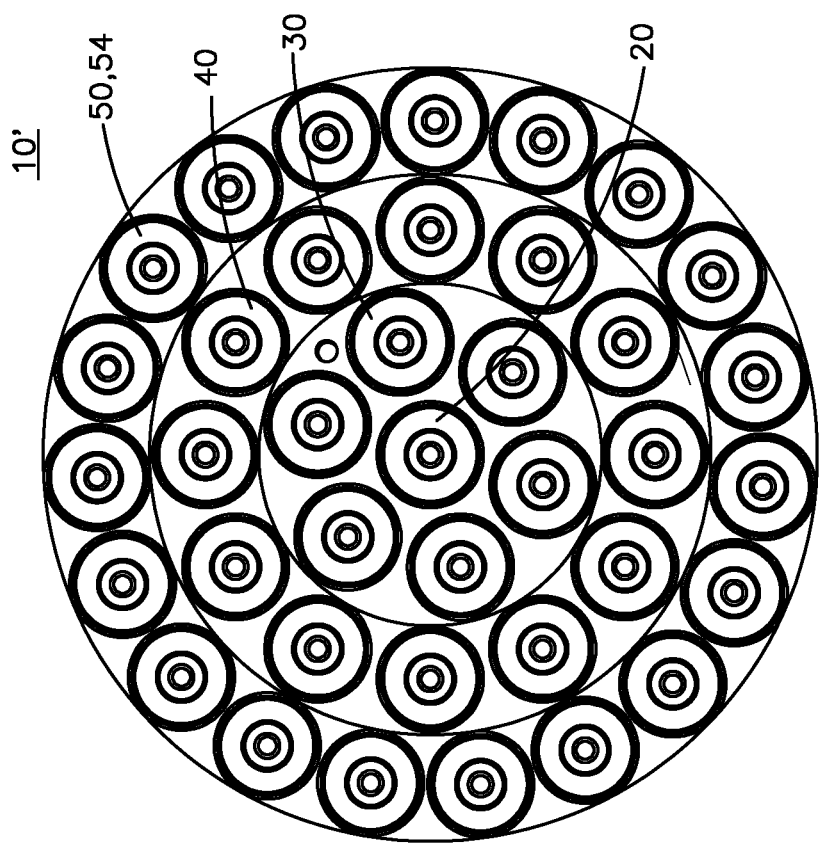
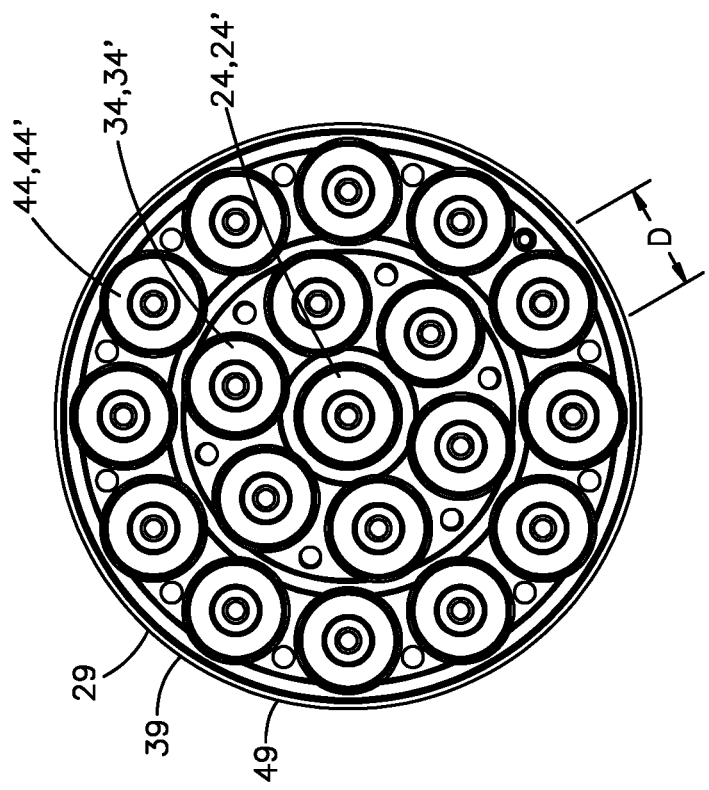

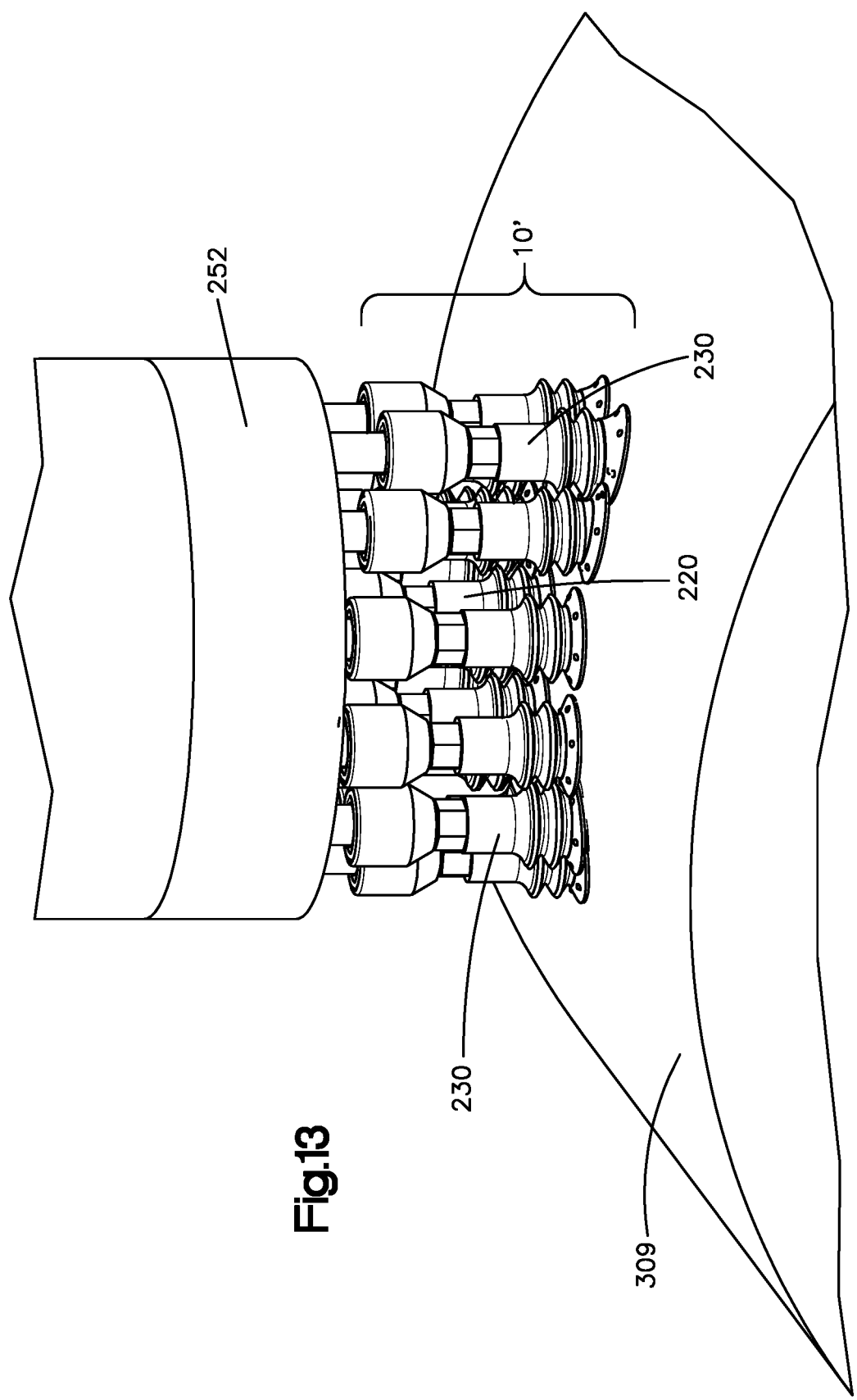

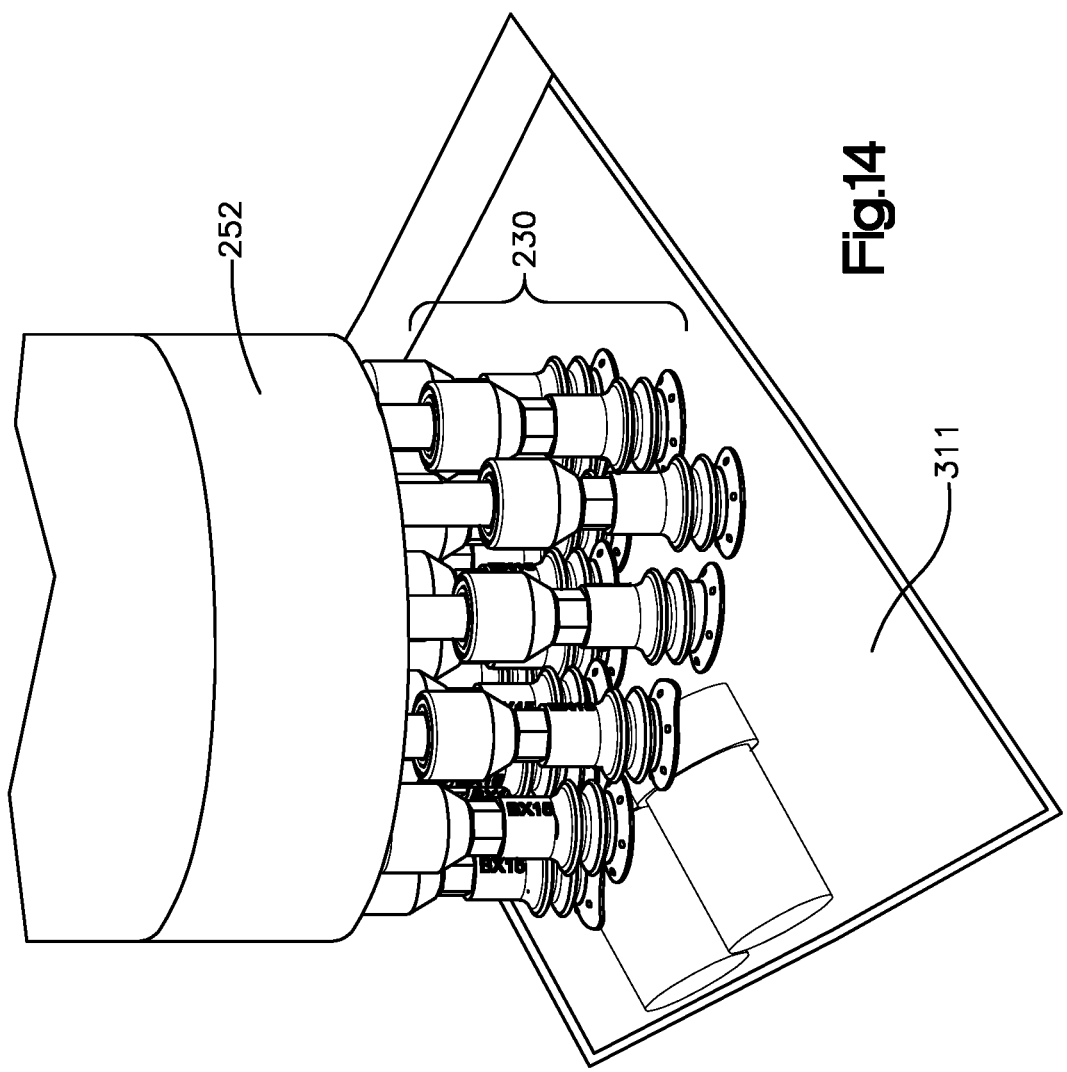

CONCENTRIC SUCTION CUP ARRAY FOR END-OF-ARM TOOL

BACKGROUND

The present invention relates to automation, and more particularly to tools for engaging and lifting items via vacuum.

The robotics field has developed many tools for engaging and lifting items at the end of an end effector. For example, end effectors sometimes employ suction cups for engaging a surface of an item and using a negative or suction pressure or vacuum to engage and lift the item.

Suction cup end of arm tools have some limitations, as the force created by the suction cup is limited by the magnitude of the negative pressure and suction cup area. In an environment in which many items of different shapes and sizes are expected to be encountered, a large suction cup may be blocked from the desired item by other items or the container in which the items may be located, or the item may be too small to engage the entire circumference of the suction cup. And a small suction cup may not be able to generate the force required to lift a heavier item.

BRIEF DESCRIPTION OF THE DRAWINGS

FIG. 2A is a schematic view of the tool of FIG. 1A engaging an object to be lifted;

FIG. 2B is a schematic view of the tool of FIG. 2A beginning to lift the object;

FIG. 2C is a schematic view of the tool of FIG. 2A having lifted the object and transporting it to a desired location;

FIG. 3A is a schematic view of the tool of FIG. 1A in its extended position engaging an irregularly shaped object;

FIG. 3B is a schematic view of the tool of FIG. 3A illustrating the suction cup assembly compliance, moving toward a retracted position;

FIG. 3C is a schematic view of the tool of FIG. 3A showing the suction cup in compliance with the irregularly shaped object;

FIG. 3D is a schematic view of the tool of in its position shown in FIG. 3C relative to the object, with the tool having lifted the object;

FIG. 4 is a schematic view of the tool of FIG. 1A in an extended position engaging and object in a corner of a tote;

FIG. 5 is a schematic side view of an end-of-tool, concentric suction cup array illustrating aspects of the present invention;

FIG. 6 is an end view of the schematic of FIG. 1A, illustrating the orientation of a center suction cup assembly and two concentric rings of suction cup assemblies;

FIG. 7 is an end view of an end-of-tool, concentric suction cup array, illustrating a center such cup assembly and three concentric rings of suction cup assemblies;

FIG. 13 is a view of the tool of FIG. 9, showing the suction cup assemblies conforming to a cylinder; and FIG. 14 is a view of the tool of FIG. 9 confirming to an irregularly shaped claim-shell package, illustrating longitudinal compliance of the suction cup assemblies and compliance of the suction cups.

DETAILED DESCRIPTION OF ILLUSTRATIVE EMBODIMENTS

End-of-tool arrays of concentric suction cup assemblies described herein have two advantages. First, in an environment in which a target item (that is, an item that a control system has identified for the end effector to pick up) is together with other items or in which a target item is in a location that an array of suction cups cannot fit (such as a small item near a cover of a tote), an extendible center suction cup assembly (only) can engage the item without the surrounding cups either inadvertently grasping adjacent, not-targeted items or blocking the end-of-arm-tool ("EOAT") from accessing the item. Second, longitudinal compliance of the rings can in some cases enable the EOAT to comply with the shape of item, such as when the EOAT engages a rounded (especially spherical) or dished item.

In this regard, an end-of-arm tool for lifting various items using vacuum pressure can include a center suction cup assembly comprising a center tube and a suction cup on a distal end of the center retractable tube, and a ring of second suction cup assemblies outboard of the center suction cup assembly, and (in some embodiments) additional rings of third suction cup assemblies and fourth suction cup assemblies, each having a suction cup and suction tube. The tool is configured to have a first position in which the center suction cup extends distally from the ring of second suction cups for engaging relatively small items and a second position in which the center suction cup is approximately co-planar with ring of second suction cups for engaging relatively large items.

In some embodiments, the rings are retractable as the force of an arm causes the center suction cup assembly and or rings of suction cups to be longitudinally displaced against a spring force. In other embodiments, the center suction cup assembly and/or rings have linear actuators. Preferably, each one of the center such cup assembly and each ring has its own, isolated and controllable vacuum source, such as a separate vacuum manifold for each ring. The suction cup can be of any type, such as a bellows, a compliant or compressible or deformable ring (such as a disk or cylinder), conical or curved, or other shape.

The corresponding method for lifting various items comprises the steps of: (a) positioning and end-of-arm tool relative to an item; (b) engaging the item with longitudinally compliant suction cup assemblies such that a least some of a ring of second suction cups and a center suction cup assembly are longitudinally displaced upon contact with the item; and (c) applying vacuum to at least some of the suction cup assemblies to lift the item.

Figure 1C:
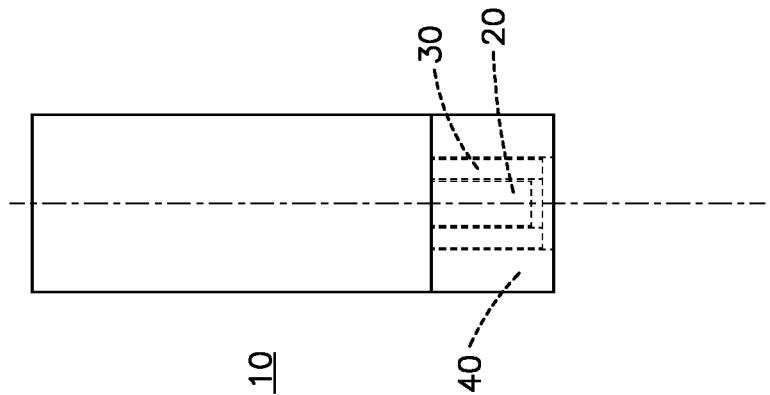
FIG. 1C is a schematic view of the tool of FIG. 1A illustrating the suction cup array in fully retracted position.
Figure 1B:
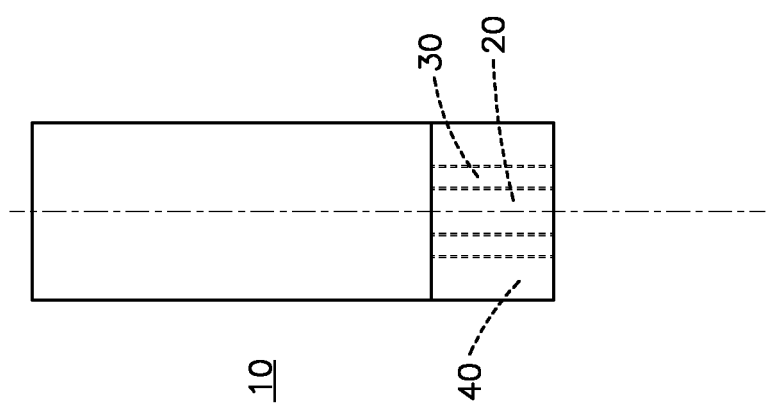
FIG. 1B is a schematic view of the tool of FIG. 1A illustrating the suction cup array in a neutral position.
Figure 1A:
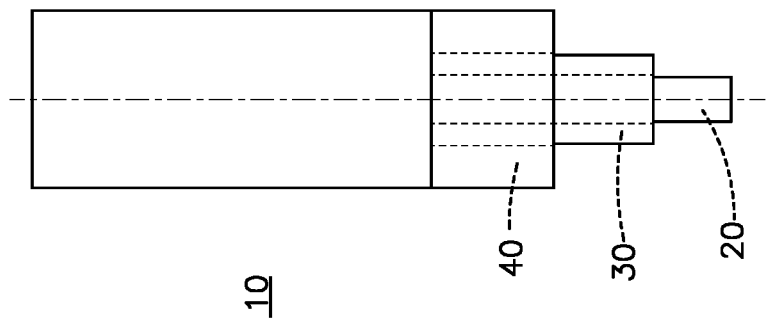
FIG. 1A is a schematic view of an end-of-arm tool illustrating a center portion in an extended position.

FIGS. 1A, 1B, and 1C schematically illustrate and end-of-arm-tool 10 having a center suction cup assembly 20, a ring 30 of second suction cup assemblies, and another ring 40 of third suction cup assemblies. FIG. 1A illustrates tool 10 with the center assembly 20 in an extended position, in which ring 30 is also extended relative to ring 40. FIG. 1B illustrates center assembly 20 parallel with rings 30 and 40 such that the suction cups are mutually parallel. FIG. 1C illustrates the center assembly 20 retracted relative to ring 30, and ring 30 retracted relative to ring 40. FIG. 4 illustrates tool 10 in its center-extended position engaging an item 205, which is located at an edge or corner of a tote 200 to show the enhanced maneuverability of tool 10 in the extended position relative to items that are difficult to reach.

FIGS. 2A through 2C illustrated operation of the center-extended position of center assembly 20 to engage (FIG. 2A), lift (FIG. 2B), and transport (FIB 2C) an item 202 that is located between items 203 and 204. In this operation, identification of item 202 for lifting may be performed by any means, such as generally described below.

FIGS. 3A through 3D illustrate the operation of tool 10 with longitudinal compliance. Tool 10 in FIG. 3A engages circular or cylindrical item 209 while in the center-extended position such that center assembly 20 engages item 209. The end effector moves toward item 209 as illustrated in FIGS. 3B and 3C such that center assembly 20 retracts relative to ring 30, and ring 30 retracts relative to ring 40 such that tool 10 is in a retracted position.

FIG. 5 is a schematic view in cross section of an end-of-arm-tool 10 that includes center suction cup assembly 20, ring 30 of second suction cup assemblies 32, and ring 40 of third suction cup assemblies 42. The reference numbers 30 and 40 (and below, 50) refer to the ring of suction cup assemblies as a whole; the reference numbers 32 and 42 refer the individual tube and suction cup assembly structures. FIG. 5 illustrates the suction cup assemblies in a neutral state, in which all the suction cups are mutually parallel.

Center suction cup assembly 20 includes a suction cup 24 at the distal end of a tube 26. Suction cup 24 is illustrated in FIG. 5 as a bellows type. The reference number 24' in FIG. 6 is intended to schematically illustrate that other type of end interfaces, such as a ring of compliant material, are encompassed by the term "suction cup," as used herein, as will be understood by persons familiar with vacuum-type end effectors. The center suction cup assembly 20 is illustrated as a single suction cup, but the present invention is not limited to a single suction cup at the center, even though a single center suction cup is preferred. For example, the term "center suction cup assembly" encompasses a tightly packed group of suction cups that function together. Suction cup 24 is referred to as "center," as it is at the center of the concentric rings 30 and 40 and preferably on or near the longitudinal centerline of tool 10.

Ring 30 includes multiple suction cup assemblies 32, each of which includes a suction cup 34 and tube 36. Each suction cup 34 and tube 36 is (individually) as described for suction cup assembly 20. Ring 40 includes multiple suction cup assemblies 42, each of which includes a suction cup 44 and tube 46. Each suction cup 44 and tube 46 is (individually) as described for suction cup assembly 20.

Ring 30 is oriented concentrically about center suction cup assembly 20, and ring 40 is oriented concentrically about center suction cup assembly 30 and ring 40. The dimension D (FIG. 6) illustrates that a suction cup (24, 24, and 44) diameter of one inch with minimal clearance between adjacent suction cups. Other configurations are contemplated. A specific dense pack of the suction cups is achieved with uniform suction cup diameters, oriented with one at the center, six in the first ring, and twelve in the next ring. Thus, FIG. 6 shows 19 suction cups in a one-six-twelve concentric configuration. A pair of plates 82 and 84 support tubes 26, 36, and 46.

Each suction cup is connected to a vacuum source. As schematically illustrated in FIG. 5, a vacuum source 28 is connected to center suction assembly 22, a vacuum 38 is connected to the suction assemblies 32 of ring 30, and a vacuum source 48 is source connected to the suction assemblies 42 of ring 40. Each one of vacuum sources 28, 38, and 48 may be individually controlled. In this regard, the vacuum pressure provided to suction assembly 22 can be controlled independent of the vacuum pressure provided to suction assemblies 32 and 42; vacuum pressure provided to suction assemblies 32 can be controlled independent of the vacuum pressure provided to suction assemblies 22 and 42; and vacuum pressure provided to suction assemblies 42 can be controlled independent of the vacuum pressure provided to suction assemblies 22 and 32.

For example, if the EOAT controls identify a target object as small and/or lightweight, the vacuum pressure to rings 30 and 40 can be diminished or shut off, while the vacuum pressure applied to suction cup 24 may set to the desired magnitude for lifting the object. And if the EOAT controls identify a target that is large and/or heavy (that is, in this context, sufficiently heavy such that engagement by multiple suction cups is desired), the vacuum pressure to one or both of suction cup rings 30 and 40 may be provided. The vacuum may be provided and regulated by any means, such as conventional controls familiar to persons familiar with vacuum-type robotic tools.

Rings 30 and 40 may be longitudinally compliant and/or controlled to be retractable relative to center suction cup assembly 20. Thus a linear actuator 39 can retract suction cup assemblies 34 together, and a liner actuator 49 can retract suction cup assemblies 44 together. Also, a linear actuator 29 may extend suction cup assembly 20. Actuators 29, 39, and 49, called out schematically in FIG. 6, may be any type of actuator, such as without limitation one or more pneumatic actuators, mechanical actuators (such as a ball screw or other screw-type actuators), or the like. As illustrated, preferably, ring 30 when retracted moves as a unit, and ring 40 when retracted moves as a unit.

FIG. 7 illustrates an EOAT 10' including a ring 50 of fourth suction cup Assemblies 52. Each suction cup assembly is as described for center suction cup Assembly 22. The embodiment of FIG. 7 includes a vacuum source and actuation as described above for the embodiment shown in FIG. 1.

Figure 8A:
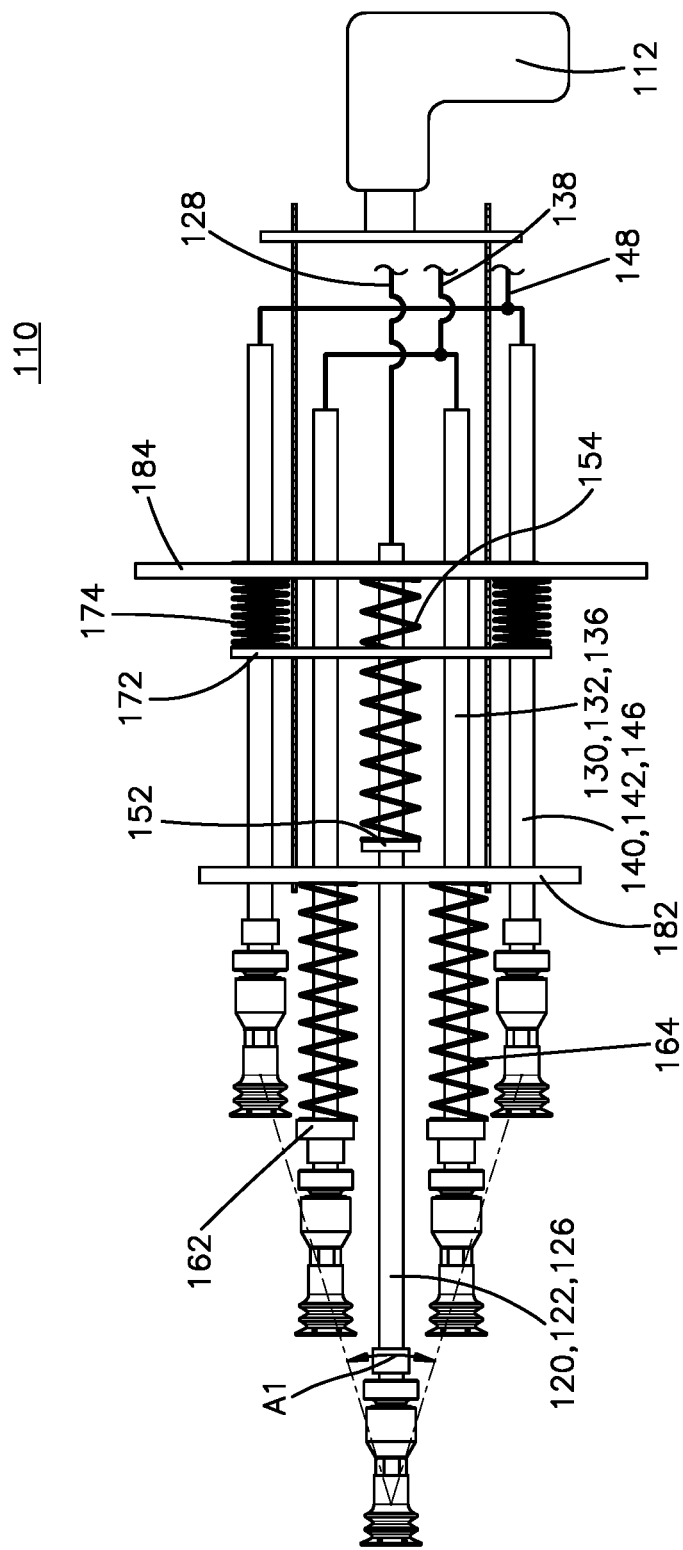
FIG. 8A is a schematic view of an end-of-arm tool illustrating concentric suction cup assemblies in the extended position.
Figure 8B:
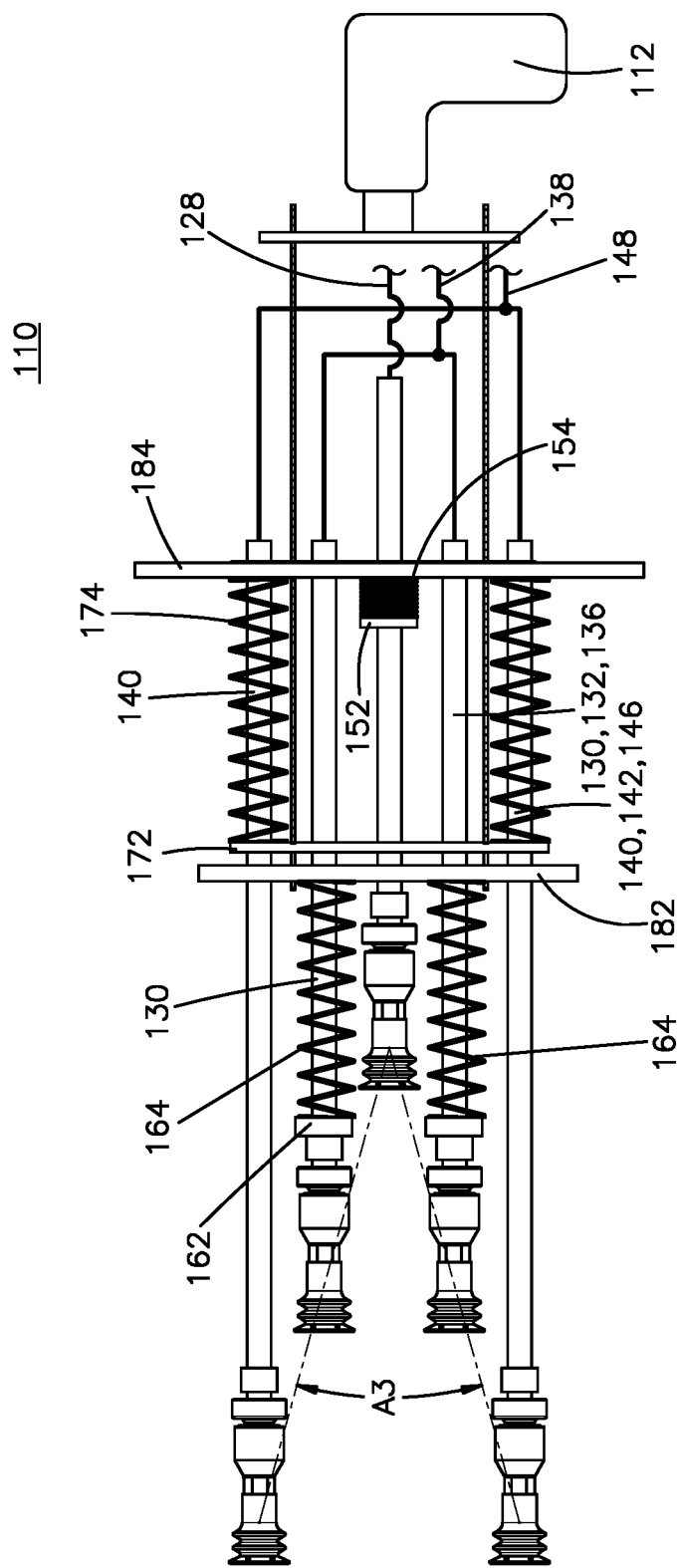
FIG. 8B is a schematic view of an end-of-arm tool illustrating concentric suction cup assemblies in a staggered, retracted configuration.
Figure 8C:
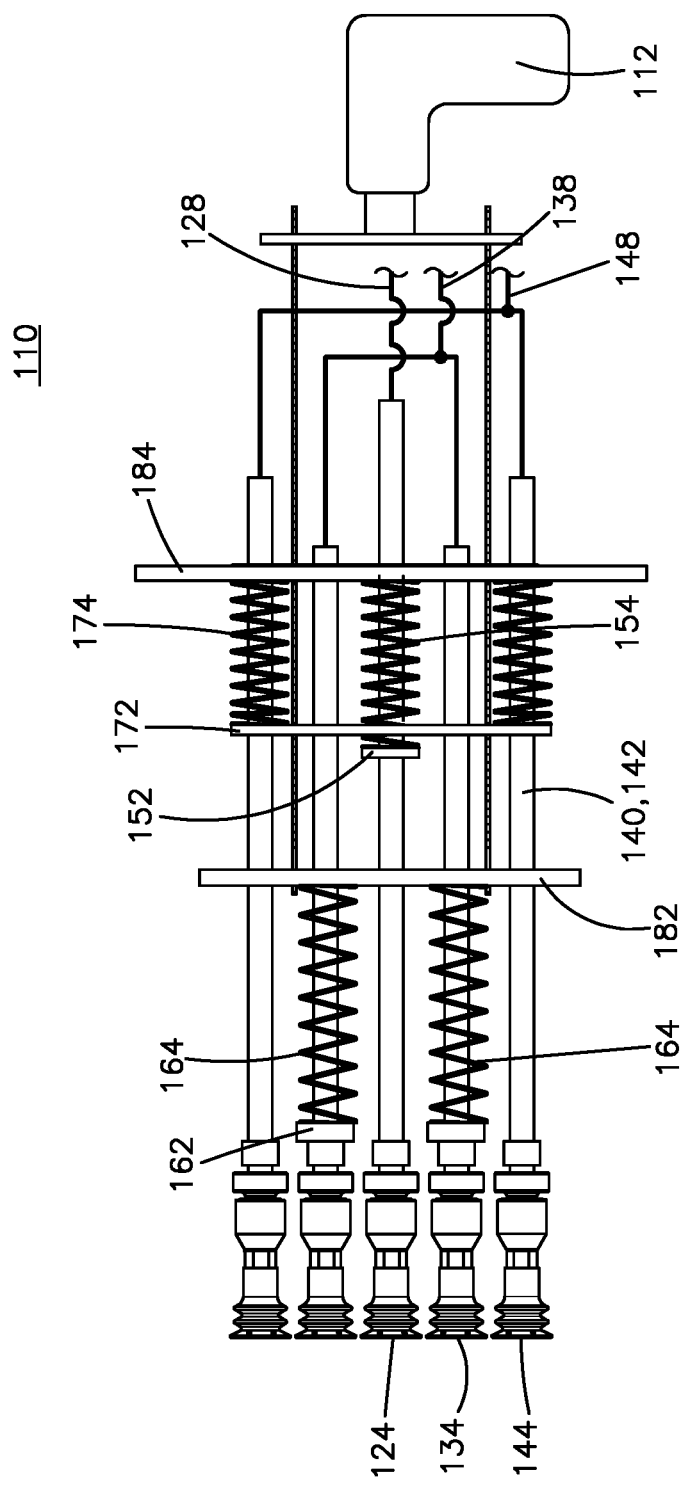
FIG. 8C is a schematic view of an end-of-arm tool illustrating concentric suction cup assemblies in another staggered, retracted configuration.

FIGS. 8A through 8C schematically illustrate an EOAT 110 as merely one example of a means for extending and retracting, and for providing longitudinal compliance of, the suction cup assemblies. Tool 110 includes a center suction cup assembly 120, a ring 130 of second suction cup assemblies 132, and a ring 140 of third suction cup assemblies 142. The suction cup and tubes of assemblies 120, 132, and 142 are as described for first embodiments 20, 32, and 42, including suction cups 124, 134, and 144, and including tubes 126, 136, and 146, respectively.

Center suction cup assembly 120 is connected to a vacuum source 128, ring 130 is connected to a vacuum source 138, and ring 140 is connected to vacuum source 148 as described above for first embodiment vacuum sources 28, 38, and 48.

Fixed plates 182 and 184 are connected together by rods, and plate 184 is connected through appropriate means to an articulated arm 112. A first compliance mechanism includes a plate 152 and a spring 154. First plate 152 is affixed to center suction cup tube 126. Spring 154 is a coil or helical spring that in the embodiment of FIG. 8A spans between plates 182 and fixed plate 184. Second compliance mechanism includes a plate 162 affixed to each one of ring 130 suction tubes 136. Plate 162 as illustrated in the figures is distal or outboard relative to fixed plate 182. Optionally, plate 162 may be omitted. A spring 164 is a coil or helical spring that spans between plate 162 and fixed plate 182. A third compliance mechanism includes a plate 172 affixed to each one of ring 140 suction tubes 146. A spring 174 is a coil or helical spring that spans between plate 172 and fixed plate 184. Springs 154, 164, and 174 preferably are pre-loaded such that plates 152, 162, and 172 have a longitudinal stop (not shown in the figures). In this regard, each spring 154, 164, and 174 preferably is under compression even in the at-rest state shown in FIG. 5. It is understood that plates 152 and 172 (and optionally plate 162) are connected to linear actuators (not shown in the figures) of any type.

In the center-extended state shown in FIG. 8A, plate 152 is in its distal or extended position, and thus center suction cup assembly 120 is in its extended position. Spring 154 is extended relative to its position in FIGS. 8B and 8C. Plate 162 and spring 164 are at a neutral position. Plate 172 is retracted, which retracts outer ring 140 and compresses spring 174 to nearly its maximum extent.

Angle A1 is formed by the suction cup assemblies in the configuration shown in FIG. 8A. Angle A1, which is measured through the longitudinal centerlines at the distal tips of the suction cups, preferably is least 10 degrees and less than 180 degrees with the ring of second suction cups, and in the embodiment shown is approximately 32 degrees.

Thus, in operation, arm 112 may move tool 110 (preferably longitudinally relative to the long axis of tool 110) until center suction cup engages 124 engages the item. Preferably, information about the target item is already stored in or accessible to the control system, or the information is otherwise ascertainable by the computer vision system or the like, such that the weight and shape of the target item is known. For items that have an exposed face that is sufficiently flat to be engaged by center suction cup 124, and that has a weight that is within the capacity of a single suction 124 (based on vacuum pressure, suction cup area, and expected air leakage between the item and suction cup), arm 112 can merely engage the item with suction cup 124. Air flow and/or pressure through tube 126 can be monitored to confirm that the target item is held and lifted.

If the control system determines that the shape and weight of the target item are such that more than center suction cup 124 is required, arm 112 can push tool 110 such that tube 126 and the plate moves longitudinally to compress spring 154 until the ring of suction cups 134 engage the target item. And if the control system determines that addition suction is required, arm 112 can push tool 110 such that tubes 126 and 136 move longitudinally to compress springs 154 and 164.

FIG. 8B illustrates tool 110 in a retracted position in which the concentric suction cup assemblies are in a staggered, retracted configuration, such as may be useful during engaging a spherical, cylindrical, or curved item, as for example illustrated in FIGS. 3A through 3D. As illustrated in FIG. 8B, plate 152 is retracted, which retracts center tube 120 and compresses spring 154 to nearly its maximum extent. Plate 162 in the embodiment of the figures does not move such that plate 162 is at or near its rest position (and at or near its position shown in FIG. 8A, although this position is not a requirement), and thus suction cup assemblies 130 are extended relative to center suction cup assembly 120. Plate 172 is at or near its fully extended or distal position, which places outer ring 140 in the fully extended position, and distal relative to ring 130.

In operation, the configuration of FIG. 8B may be employed as desired, for example based on information about the target item already stored in or accessible to the control system, or the information is otherwise ascertainable by the computer vision system or the like, such that the weight and shape of the target item is known. Rings 140 and 130, and optionally center assembly 120, can move longitudinally by compression of springs 174, 164, and (optionally) 152 as needed upon engagement of the item, consistent with the control methods explained herein.

Further, springs 154, 164, and 174 may be compressed as needed for tool 110 to conform to the shape of some objects. For example, the assemblies 120, 130, and/or 140 can longitudinally retract when engaging spherical objects, such as an unboxed basketball or medicine ball, or dished objects.

FIG. 8C illustrates tool 110 in its neutral position in which all the suction cups are positioned on a common plane. Plates 152 and 172 are approximately mid-way between retracted and extended positions, such that springs 154 and 174 are partially compressed to position center suction cup(s) of assembly 120 at the same position as the suction cups of outer ring 140. Plate 162 and ring 130 is at the same position shown in FIGS. 8A and 8B.

In operation, the configuration of FIG. 8C may be employed as desired, for example based on information about the target item already stored in or accessible to the control system, or the information is otherwise ascertainable by the computer vision system or the like, such that the weight and shape of the target item is known. For many items having a flat surface large enough for all of such cups 24, 34, and 44 to engage, especially if relatively heavy, the configuration of FIG. 8C may be the desired configuration. Suction cups 24, 34, and 44 are planar, which enables springs 154, 164, and 174 to compress, as needed to conform to the item. Control of the configuration shown in 8C is consistent with the control methods explained herein.

Figure 9:
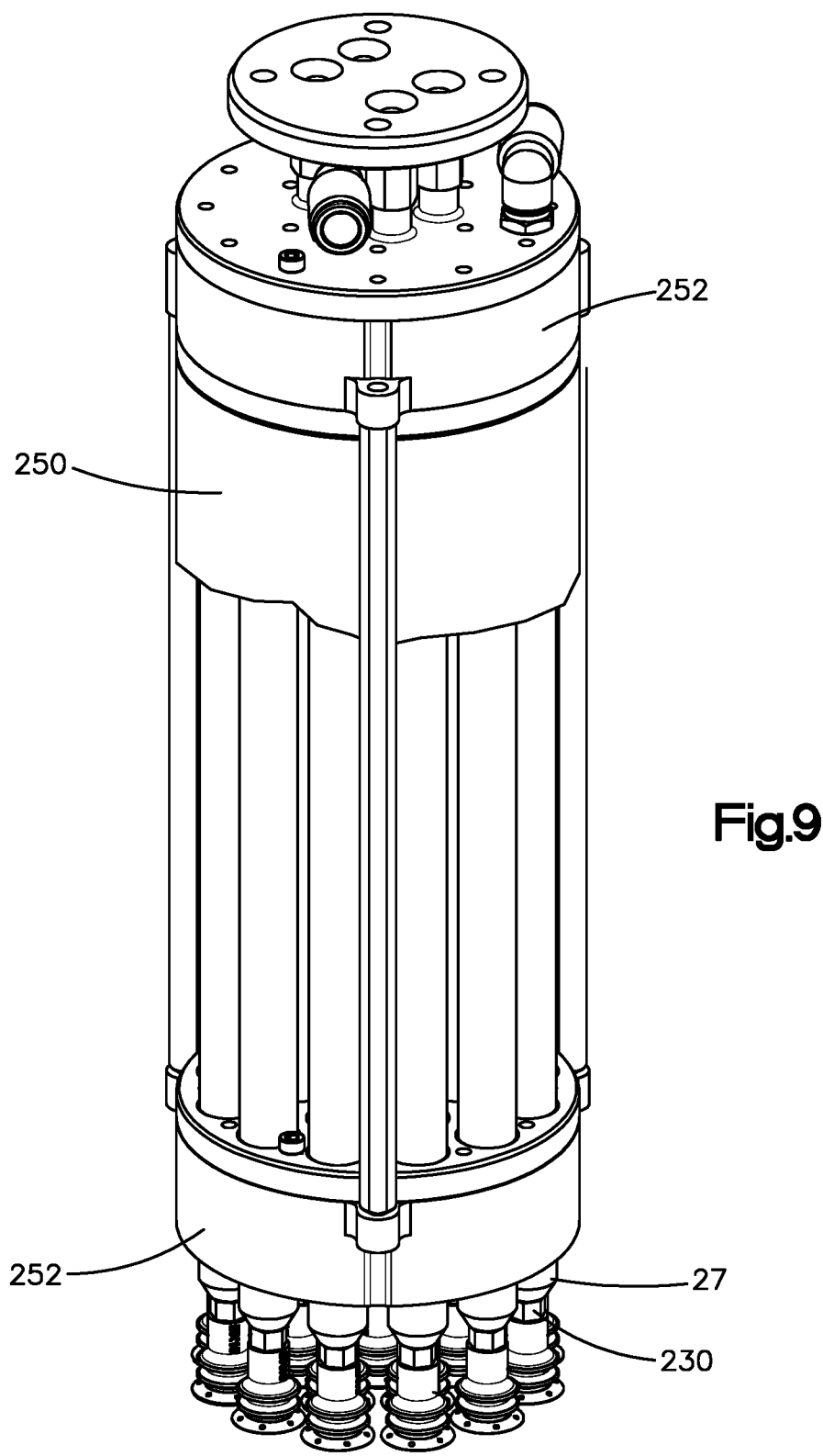
FIG. 9 is view of an embodiment of an end-of-arm, concentric suction cup tool.
Figure 10:
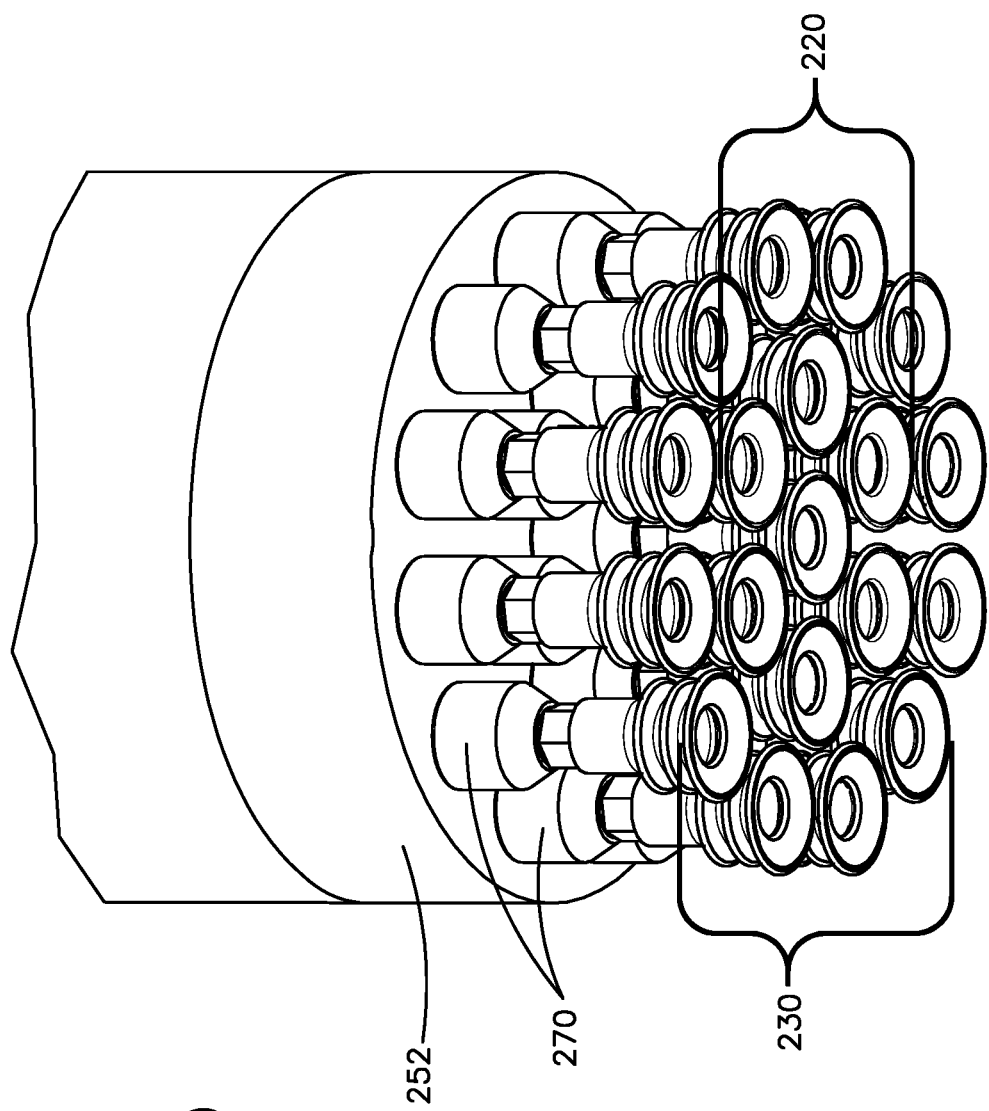
FIG. 10 is an end perspective view of a portion of the tool of FIG. 9, showing three center suction cups in a slightly extended position.

FIGS. 9 and 10 illustrate the tightly-packed configuration of rings 30 and 40. As illustrated in FIGS. 6 and 10, tool 10 preferably includes a single center suction cup assembly 22, six second suction cup assemblies 32, and twelve third suction cup assemblies. FIGS. 9 and 10 also illustrate a bottom and top manifolds 250 and a cover 252, which is partially cut away in FIG. 9.

Figure 11:
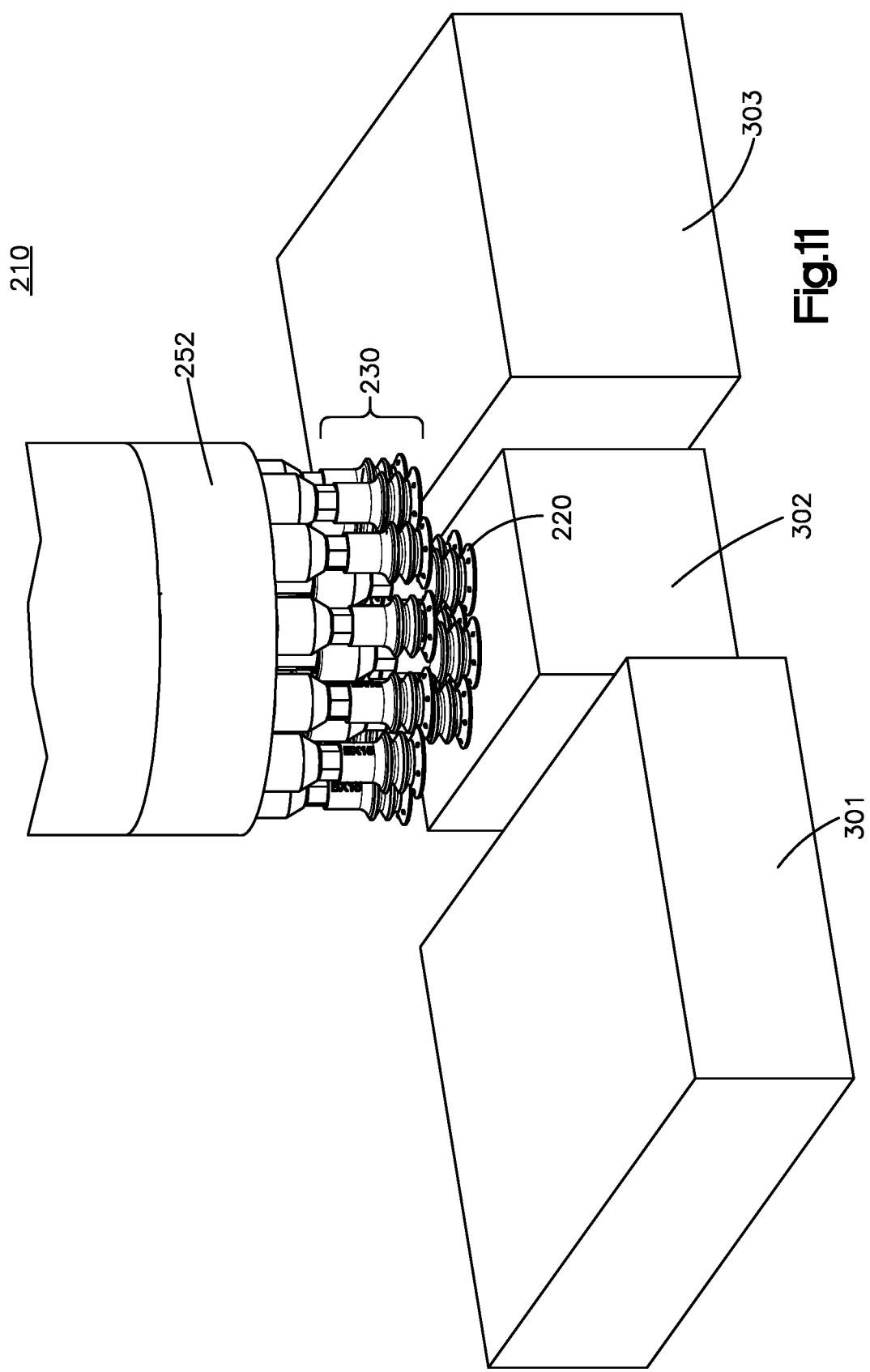
FIG. 11 is view of the tool of FIG. 10 engaging an object between adjacent objects.
Figure 12:
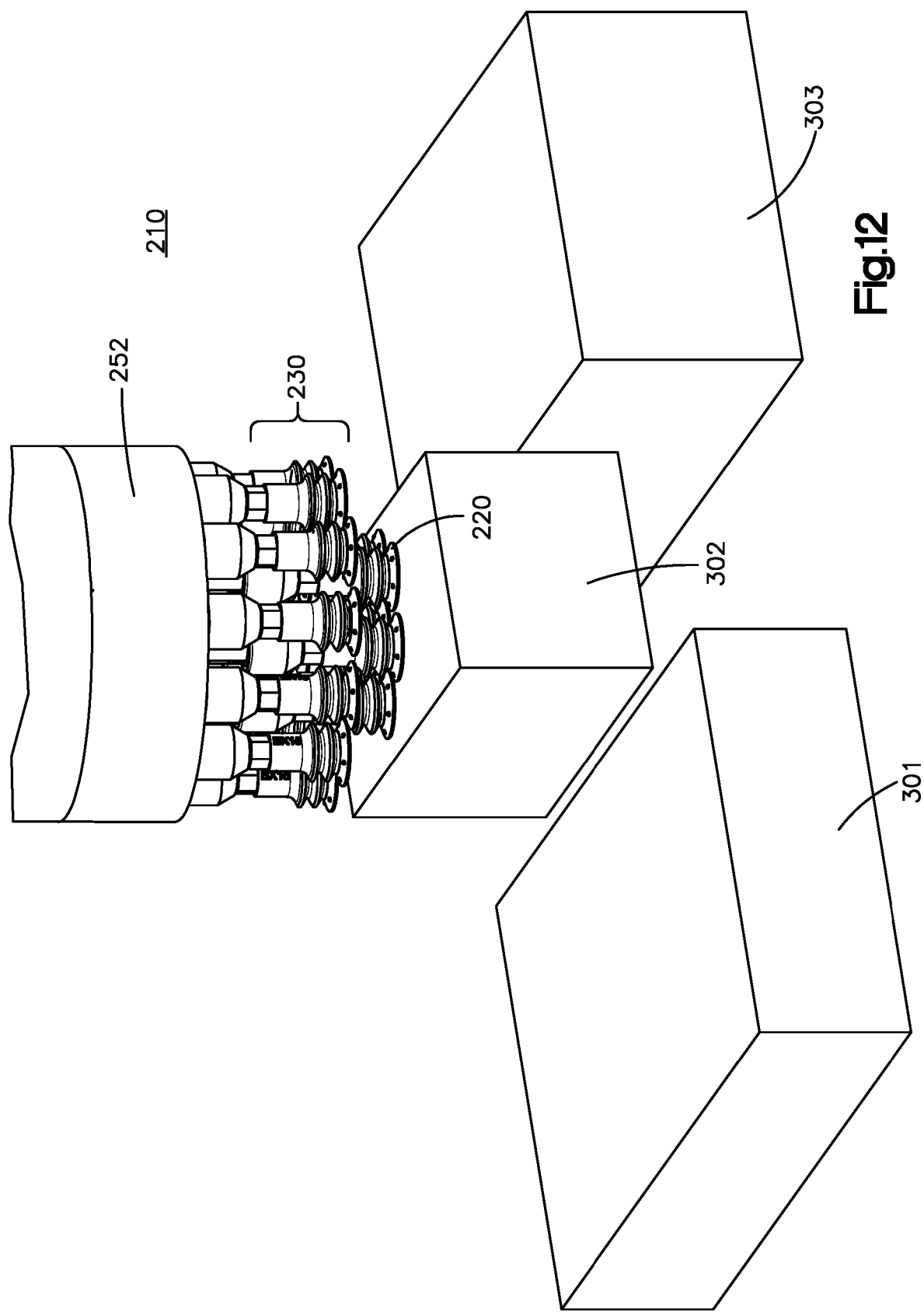
FIG. 12 is another view of the tool of FIG. 11, having lifted the object and transporting it.

FIGS. 11 and 12 illustrate tool 210 (as representing the function of the tools described herein) an item 302 between items 301 and 303. FIGS. 13 and 14 illustrate the compliance of suction cup assemblies 220 and 230. As illustrated in FIG. 13, upon engaging cylindrical item 309, suction cup assemblies 220 and 230 near the longitudinal centerline of item 309 longitudinally retract in response to a force applied by the arm 212 and transmitted through the suction cup assemblies. In this regard, the tubes 226 and 236 may move against the spring biases illustrated in FIGS. 8A through 8C. The suction cup assemblies that are distal from the centerline are not retracted or retracted to a lesser magnitude than the retraction of the tubes at the longitudinal centerline. Further, the suction cups 224 and 234 comply with the cylindrical surface, as the cups locally deform.

As illustrated in FIG. 14, upon engaging a clamshell 311 having an irregularly shaped items (shown as pill bottles), some suction cup assemblies 230 retract in response to a force applied by the tool 210 by arm 212 and transmitted through the suction cup assemblies. Further, suction cups 234 comply with the irregular surface, as the cups locally deform.

The end effector may be controlled through instructions from the control system. Specifically, the control system may receive input from a human operator and/or a grasp planning program so as to employ custom grasping strategies for various shapes of items. For example, in relation to suction-type end effectors, six-sided boxes with planar surfaces may require only a simple grasping strategies regardless of size and orientation. But items with more complex surfaces may be difficult to grasp, especially if these items are disposed in close proximity to other items and objects, such as when multiple items are disposed in a storage container. Items that are relatively difficult to grasp may be actuated using a more complex grasping strategy that is based on characteristics of the item and the item's location relative to other items and objects that the control system receives via system sensors and/or from an item database.

In some embodiments, the control system may receive data from one or more optical sensors disposed on and/or around the end effector. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two dimensional image of the item showing a feature may allow an identification of a respective surface. If the two dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three dimensional space. Alternatively, or additionally, the control system may receive data from one or more optical sensors in a scan tunnel disposed upstream of the end effector.

Alternatively, or additionally, the control system may receive data indicating grasping strategies that have been successful or unsuccessful for the same or similar items in the past. Success data may be based on a specific end effector and/or a specific type of end effector. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, whether scooping the item was unsuccessful, damages resulting from using particular manipulations, end effectors, or forces, etc.).

The control system may weigh data from the end effector itself more heavily than other end effectors with the same design to account for iterative manufacturing differences in the end effectors. The control system may also receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The term "end of arm" refers to the distal or working end of any kind of end effector, including without limitation a robotic arm, a gantry, and any other configuration capable of positioning the suction cup tool. The EOAT structure and function are described herein by referring to advantages and specific examples or embodiments. The present invention is not limited to the advantages explained herein, nor to the structure or function of the examples or embodiments. Rather, it is intended that the invention be given the full scope of the plain meaning of the claims.

What is claimed:

1. A suction cup tool for the end of a robotic arm, the suction cup tool comprising:
   a center suction cup assembly including at least one suction cup and at least one suction tube;
   one or more concentric rings of tightly packed suction cup assemblies around the center suction cup assembly, each one of the suction cup assemblies including a suction cup and a suction tube;
   a first vacuum source coupled to the center suction cup assembly;
   a first ring vacuum source coupled to a first one of the one or more rings of suction cup assemblies, the first ring vacuum source being configured to be controllable independent of control of the first vacuum source;
   wherein each suction cup assembly is configured to be rearwardly moveable relative to adjacent suction cups in response to engaging an object, wherein each suction cup is compliant; and wherein each one of the rings of suction cup assemblies is longitudinally moveable as a unit.

2. The suction cup tool of claim 1 wherein the one or more rings is a first ring of suction cup assemblies and a second ring of suction cup assemblies; each one of the rings of suction cup assemblies and the center suction cup assembly being configured to have an extended position in which the center suction cup assembly extends distally relative to the rings; a neutral position in which the suction cups are approximately parallel, and a retracted position in which the center suction cup assembly is retracted relative to the first ring, and the first ring is retracted relative to the second ring.

3. An end-of-arm tool for lifting various items using vacuum pressure, the tool comprising:
   a center suction cup assembly comprising a center tube and a suction cup on a distal end of the center tube, the center tube adapted for connecting a center vacuum source to the center suction cup;
   a ring of second suction cup assemblies outboard of the center suction cup assembly, each one of the second suction cup assemblies comprising a second tube and a second suction cup; and
   the center tube of the center suction cup assembly and the second tubes of the second suction cup assemblies being configured to be longitudinally moveable in response to a force applied upon engaging an item, and each one of the suction cups of the center suction cup assembly and the second suction cup assemblies being compliant in response to engaging an item; and
   a first vacuum supply assembly and a second vacuum supply assembly, the first vacuum supply assembly being coupled to the center suction cup assembly, and the second vacuum supply assembly being coupled to each one of the second suction cup assemblies for control of vacuum to the ring of second suction cup assemblies as a single unit;
   whereby the tool is configured to have a center-extended position in which the center suction cup extends distally from the ring of second suction cups for engaging relatively small items and a neutral position in which the center suction cup is approximately co-planar with the ring of second suction cup assemblies for engaging relatively large items.

4. The end-of-arm tool of claim 3 wherein the tool is configured to have a center-retracted position in which the center suction cup assembly is retracted relative to the ring of second suction cups.

5. The end-of-arm tool of claim 3 further comprising one or more concentric rings of concentric-ring suction cup assemblies outboard of the ring of second suction cup assemblies, each one of concentric-ring suction cup assemblies comprising a tube and a suction cup, each one of the concentric-ring suction cup assemblies being longitudinally moveable in response to engaging an item, and each one of the suction cups of the concentric-ring suction cup assemblies being compliant in response to engaging an item.

6. The end-of-arm tool of claim 5 wherein in the center-extended position, each ring of concentric-ring suction cup assemblies is retracted relative to its adjacent, inboard ring.

7. The end-of-arm tool of claim 5 wherein the tool is configured to have a center-retracted position in which the center suction cup assembly is retracted relative to the ring of second suction cups, the ring of second cups is retracted relative to an outboard one of the concentric-ring of suction cups.

8. The end-of-arm tool of claim 5 wherein each one of the one or more concentric rings of suction cup assemblies includes a vacuum source that is independently controllable relative to other vacuum sources.

9. The end-of-arm tool of claim 5 further including a center actuator for extending and/or retracting the center suction cup assembly and a first ring actuator for extending and/or retracting the ring of second suction cup assemblies together as a unit.

10. The end-of-arm tool of claim 5 further including a center actuator for extending and/or retracting the center suction cup assembly, and wherein each ring has an actuator for extending and/or retracting the suction cup assemblies of the ring as a unit.

11. The end-of-arm tool of claim 10 wherein the actuators are spring biased plates.

12. The end-of-arm tool of claim 5 wherein the suction cup includes a bellows or a compliant, cup-like ring.

13. The end-of-arm tool of claim 3 wherein, when configured in the center-extended configuration, the center suction cup forms an angle A of at least 10 degrees and less than 180 degrees with the ring of second suction cups.

14. The end-of-arm tool of claim 3 wherein, when configured in the center-extended configuration, the center suction cup forms an angle of between 25 and 45 degrees with the ring of second suction cup assemblies.

15. The end-of-arm tool of claim 14 wherein, when configured in a retracted position, the center suction cup forms an angle of at least 90 degree and less than 180 degrees.

16. A method for lifting various items comprising the steps of:
   (a) positioning the end-of-arm tool of claim 3 relative to an item;
   (b) engaging the item such that a force applied on the item longitudinally depresses at least one of suction cup assemblies; and
   (c) applying vacuum to at least one of the center suction cup assemblies and the ring of second suction cup assemblies.

17. The method of claim 16 wherein the engaging step (b) includes extending and/or retracting the center suction cup assembly relative to the ring of second suction cups.

18. The method of claim 16 wherein the engaging step (b) includes extending and/or retracting the ring of second suction cups together as a unit.

* * * * *